(12) United States Patent
Bradley

(10) Patent No.: US 7,030,333 B2
(45) Date of Patent: Apr. 18, 2006

(54) METHOD OF JOINING PLATES WITH WELD FASTENED STUDS

(76) Inventor: David A. Bradley, 820 Mahantongo St., Pottsville, PA (US) 17901

( * ) Notice: Subject to any disclaimer, the term of this patent is extended or adjusted under 35 U.S.C. 154(b) by 0 days.

(21) Appl. No.: 11/031,405

(22) Filed: Jan. 7, 2005

(65) Prior Publication Data
US 2005/0161442 A1    Jul. 28, 2005

Related U.S. Application Data

(60) Provisional application No. 60/538,410, filed on Jan. 22, 2004.

(51) Int. Cl.
*B23K 9/20*    (2006.01)

(52) U.S. Cl. .......................................... 219/99; 219/93

(58) Field of Classification Search .................. 219/98, 219/99, 93
See application file for complete search history.

(56) References Cited

U.S. PATENT DOCUMENTS

| | | | | |
|---|---|---|---|---|
| 3,774,009 A * | 11/1973 | Hodges | ....................... | 219/98 |
| 4,063,060 A * | 12/1977 | Litch, III | ..................... | 219/93 |
| 4,119,827 A * | 10/1978 | Lenox | .......................... | 219/98 |
| 4,261,245 A * | 4/1981 | Mauer | .......................... | 219/98 |
| 5,579,986 A * | 12/1996 | Sherry et al. | .................. | 219/99 |

* cited by examiner

Primary Examiner—Clifford C. Shaw
(74) Attorney, Agent, or Firm—Drinker Biddle & Reath LLP

(57) ABSTRACT

A method of joining plates includes the steps of providing a one or more studs having a head, a barrel and a weld tip. The plates and studs are arranged such that a first plate having at least one hole is located between the studs and a second plate with each stud aligned with a hole and contacting the second plate. Current is passed through the stud using the stud head and the second plate as electrodes to melt the weld tip bonding the stud to the second plate. The studs are arranged such that an air gap between the studs and the first plate prevents arcing during the welding step. Pressure and heat may be applied to compress the barrel such that the stud functions as a rivet. Alternatively, the barrel may remain uncompressed to provide a pin allowing relative rotation between the plates.

10 Claims, 2 Drawing Sheets

METHOD OF JOINING PLATES WITH WELD FASTENED STUDS

CROSS-REFERENCE TO RELATED APPLICATION

This application claims priority from U.S. Provisional Patent Application No. 60/538,410, filed Jan. 22, 2004.

FIELD OF THE INVENTION

The invention relates to fasteners and methods of joining metal plates.

BACKGROUND OF THE INVENTION

It is well known to fasten two metal plates together with rivets. The barrel of the rivet is inserted through aligned holes in the plates (or can be punched through soft metal) and the end is hammered or compressed by other means to expand it and sandwich the plates between the expanded end and the rivet head. The plates are fixed together, but they have the rivet head protruding on one side and the expanded end protruding from the other. It is known to use surface grinding and polishing to smooth the expanded end of the rivet to match the surface.

What is needed is a method of joining plates without the need to penetrate both plates being joined to provide a smooth outside surface opposite the rivet head, thereby eliminating the need for surface grinding and polishing.

SUMMARY OF THE INVENTION

According to the invention, a method of joining plates comprises the steps of providing first and second metal plates and a stud made from an electrically conductive material. The stud includes a head, a barrel and a weld tip. The first plate includes at least one hole having a diameter. The barrel of the stud has a length that is greater than a thickness of the first plate and a diameter that is less than the diameter of the first plate hole.

The plates are located such that the first plate is located between the stud and the second plate with a central axis of the stud aligned with a central axis of the hole. The stud is then moved towards the second plate such that the weld tip of the stud contacts the second plate. Air gaps are respectively provided between the head of the stud and the first plate and between the barrel and the hole. An electric current is applied through the stud using the head of the stud and the second plate as electrodes sufficient to melt the weld tip whereby the stud is bonded to the second plate at an end of the stud.

According to one embodiment, the method further includes the step of deforming the barrel of the stud, preferably by applying a force to the head of the stud, to reduce a length of the barrel and substantially eliminate the air gap between the stud head and the first plate such that the stud acts as a rivet.

According to an alterative embodiment, the barrel of the stud is not deformed such that the stud acts as a pin allowing the plates to pivot with respect to each other.

According to one embodiment of the invention, the stud includes a threaded extension attached to the head of the stud for attaching a structure to the joined plates using the extension.

BRIEF DESCRIPTION OF THE DRAWINGS

For the purpose of illustrating the invention, the drawings depict one or more embodiment that is presently preferred. This invention is not, however, limited to the embodiment or use of the invention that is depicted in the drawings.

DETAILED DESCRIPTION OF THE DRAWINGS

Figure 1A:
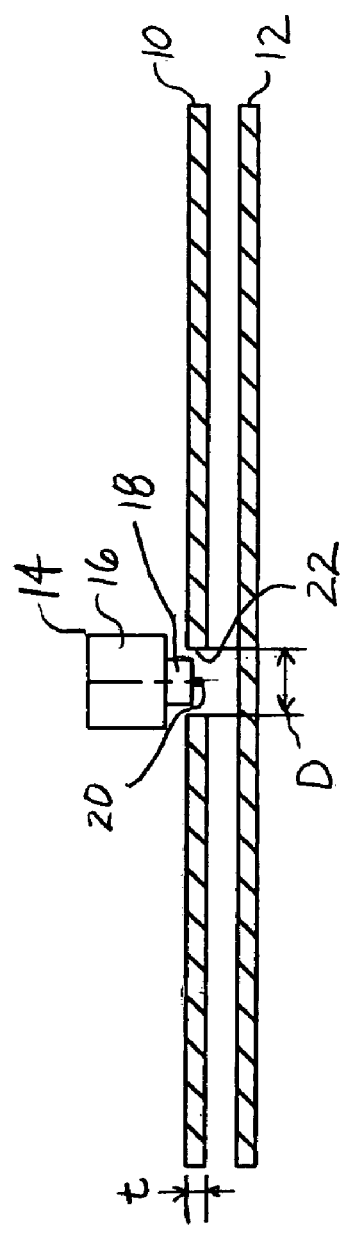
FIGS. 1A through 1D are side elevation views, partly in section, illustrating a method of joining plates with a welded stud according to the present invention.
Figure 1B:
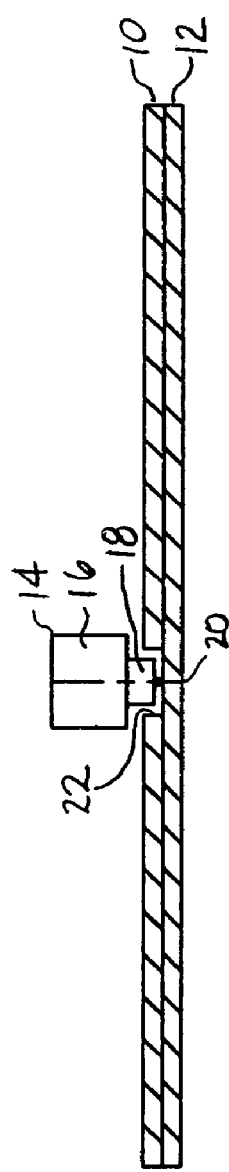

Referring to the drawings, where like numerals identify like elements, there is shown in FIGS. 1A to 1D a method of joining plates 10, 12 using a stud 14 made from an electrically conductive material. The stud 14, which is shown in greater detail in FIG. 2, includes a head 16, a barrel 18 and a weld tip 20. As described below, the stud 14 can be used as either a rivet or pin to join plates 10, 12. The immediately following description is of the method using the stud 14 as a rivet, and the stud 14 is described as a rivet. Later the stud 14 is described as a pin in applications where the plates are intended to rotate relative to each other around the pin.

As shown in FIGS. 1A to 1D, plate 10 is tapped by a drill or punch to produce a hole 22, or a pattern of holes, corresponding to the location(s) of rivet placement. The tapped plate 10 is then laid over the second plate 12. An electro-weld bonder then locates a rivet 14 in the middle of the hole 22 in the top plate 10 such that the weld tip 20 of the rivet 14 touches the bottom plate 12. Using the head 16 of the rivet 14 as one electrode and the bottom plate 12 as the other, a current is passed through the rivet 14 to melt the weld tip 20 of rivet 14 securing the rivet 14 to the bottom plate 12.

The length, $L_B$, of the barrel 18 of rivet 14 is greater than the thickness, t, of top plate 10 such that the head 16 of rivet 14 does not touch the top plate 10 while the weld is being made. A minimum clearance sufficient to prevent electrical arcing from the head 16 to the top plate 10 should be maintained. The diameter, D, of the hole 22 in the top plate 10 is selected to be less than the diameter, $D_H$, (or diagonal, if not circular) of the head 16 of rivet 14, but greater than the diameter, $D_B$, of barrel 18 of rivet 14 by an amount sufficient to create an air gap between the hole 22 and the barrel 18 that is sufficient to prevent electrical arcing from the barrel 18 to the top plate 10. Thus, the rivet 14 can be welded to the bottom plate 12 "through the hole" in the top plate 10.

Figure 1C:
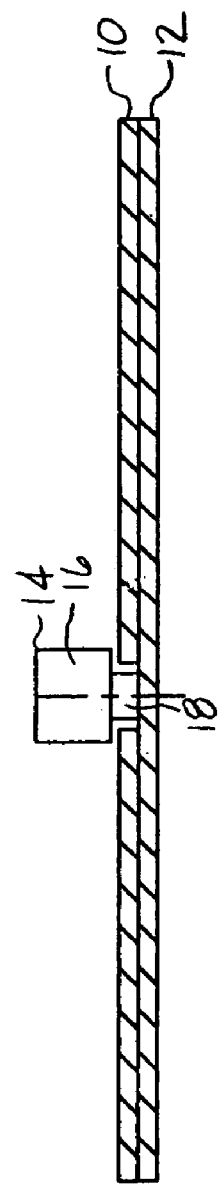
Figure 2:
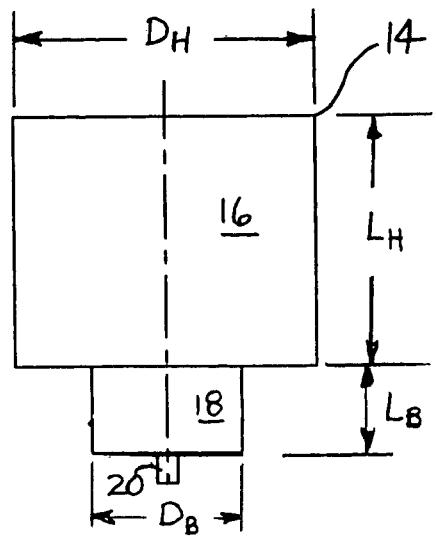
FIG. 2 is a side elevation view of a stud used in the method of FIGS. 1A through 1D.

When the rivet 14, or rivets, joining the plates 10, 12 are welded in place, the plates can move apart from each other by a distance equal to the amount that the length of the rivet barrel 18 exceeds the thickness, t, of top plate 10 (i.e., by the amount of the vertical gap shown in FIG. 1C between top plate 10 and the head 16 of rivet 14). To make an immoveable attachment, the rivet 14 is compressed by sufficient force, or combination of force and heat, to drive the rivet head 16 against the top plate 10 and cause the material of barrel 18 to flow into the hole 22 in top plate 10 in the gap between the barrel 18 and the hole 22. The result is a strong attachment between the plates 10, 12 without penetration of the bottom plate 12.

In the first step, as shown in FIG. 1A, the tapped top plate 10 is overlaid on the bottom plate 12, and a rivet 14 is provided. The relative dimensions of the hole 22 and rivet 14 are selected as described above to prevent arcing to the top plate 10. As a non-limiting example, a barrel diameter, $D_B$, of 0.1875 inch (3/16) and a hole diameter, D, of 0.282 inches produces an air gap of 0.047 inches between the rivet barrel 18 and the sides of the hole 22, which has been found sufficient to prevent arcing. The length, $L_B$, of barrel 18 is sufficiently larger than the thickness, t, of top plate 10 to maintain a gap between rivet head 16 and the top plate 10. The diameter, $D_H$, of the rivet's head 16 can be any reasonable size that is larger than the diameter of the hole, D, such that it can be compressed against the top plate 10. For the above hole 22 having a diameter of 0.282 inches, a rivet head 16 having a diameter of 3/8 inches and a length, $L_H$, of 5/8 inches was found to be sufficient.

In the second step, illustrated in FIG. 1B, the rivet 14 is centered in the hole 22, preferably using a robotic weld head, with the weld tip 20 touching the bottom plate 12. In the third step, illustrated in FIG. 1C, electrical current is passed though the rivet 14 to the bottom plate 12 sufficient to melt the weld tip 20 causing the end of the rivet 14 to be attached to the bottom plate 12, but still leaving an air gap of 0.0320 inches between the rivet head 16 and an upper surface of the top plate 10.

Figure 1D:
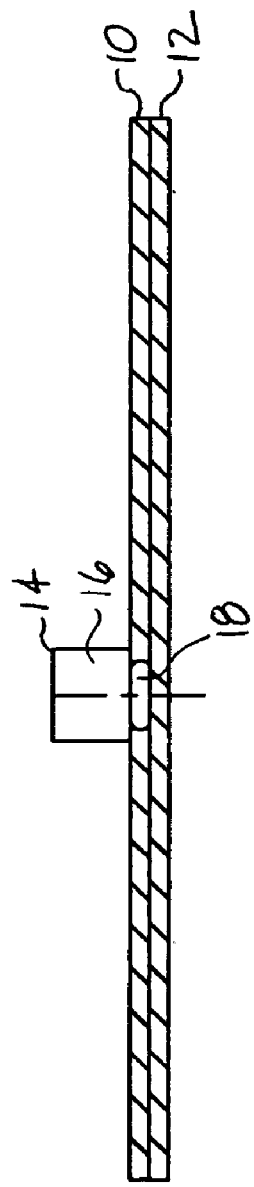

In step 4, which is illustrated in FIG. 1D, a press is used to compress the rivet 14 by application of sufficient force, or combination of force and heat, to deform the barrel 18. The deformation of barrel 18 causes the barrel 18 to flow into the gap between the hole 22 and the barrel 18 such that the rivet head 16 is driven against the top plate 10. The process preferably compresses all of the rivets 14 joining the two plates 10, 12 at one time.

Although the process is described in relation to the two plates 10, 12, it would work with one or more additional plates between the top and bottom plates.

The method of electro-welding the stud 14 to the bottom plate 12 through a hole 22 in the top plate 10, without causing arcing to the top plate 10, can also be used to create a pin that holds the plates 10, 12 together but allows them to rotate in their plane with respect to each other. Where a pin is desired, the fourth step shown in FIG. 1D of compressing the stud 14 can be omitted, so that the resulting pin 14 attached to the bottom plate 12 allows rotation of the top plate.

Figure 3:
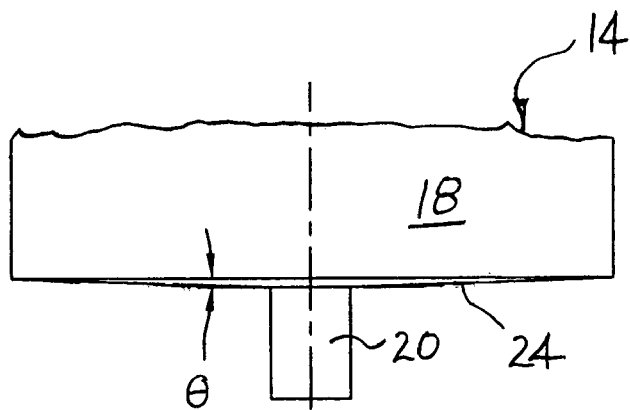
FIG. 3 is a detail view of a barrel and weld tip of the stud of FIG. 2.

Referring to FIG. 3, there is shown an enlarged view of the barrel 18 and weld tip 20 of stud 14. As shown, the weld tip 20 is connected to an end face 24 of barrel 18 that preferably tapers in the nature of an extremely shallow frustum. The frustum angle, θ, is preferably approximately 2 degrees with respect to a plane that is perpendicular to the stud central axis. The inclusion of the shallow frustum end face 24 locates the weld tip 20 in a slightly projected position from the barrel 18 compared to that which would be provided were the barrel simply provided with a flattened end face perpendicular to the stud central axis. The projection of the weld tip 20 in this manner ensures that contact will be maintained between the weld tip 20 and an upper surface of bottom plate 12 as the weld tip 20 is melted by electric current as described above.

Figure 4:
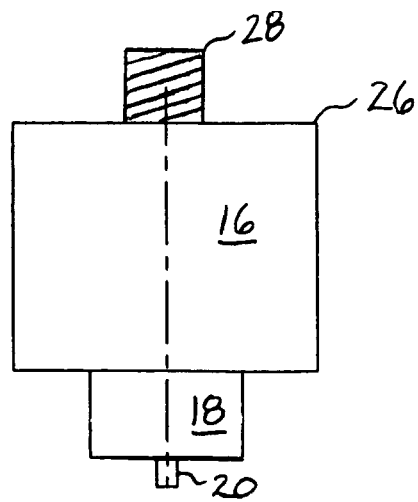
FIG. 4 is a side elevation of an alternative stud according to the present invention.

Referring to FIG. 4, an alternate stud 26 according to the invention includes a threaded extension 28 secured to a top surface of the head 16. By applying the compression force of the fourth step of FIG. 1D to a portion of top surface of head 16 that surrounds the threaded extension 28, the barrel 18 will compress without causing deformation of the extension 28. This embodiment would allow another structure to be attached to the joined plates using the threaded extension 28 of stud 26.

The foregoing describes the invention in terms of embodiments preferred by the inventor for which an enabling description was available, notwithstanding that insubstantial modifications of the invention, including those not presently foreseen, may nonetheless represent equivalents thereto.

What is claimed is:

1. A method of joining plates comprising the steps of:
providing first and second metal plates, the first plate including at least one hole;
providing a stud made from an electrically conductive material, the stud including a head, a barrel and a weld tip, the barrel having opposite ends respectively connected to the head and the weld tip, the barrel having a diameter that is less than the diameter of the hole and having a length that is greater than the thickness of the first plate;
locating the plates such the first plate is located between the stud and the second plate;
locating the stud such that a central axis of the stud is aligned with a central axis of the hole;
moving the stud toward the second plate such that the weld tip of the stud contacts the second plate and air gaps are respectively provided between the head and the first plate and between the barrel and the hole;
applying an electric current through the stud, using the head of the stud and the second plate as electrodes, that is sufficient to melt the weld tip whereby the stud is bonded to the second plate at an end of the stud; and
deforming the barrel of the stud to reduce the length of the barrel thereby reducing the air gap between the head of the stud and the first plate.

2. The method according to claim 1 wherein the step of deforming the barrel results in the air gap between the head of the stud and the first plate being substantially eliminated.

3. The method according to claim 2, wherein the step of deforming the stud results in substantial elimination of the air gap between the barrel and the hole of the first plate.

4. The method according to claim 1, wherein the step of deforming the barrel includes the step of:
applying force to the head of the stud such that the barrel of the stud is compressed.

5. The method according to claim 4, wherein the step of deforming the stud further includes the step of heating the stud.

6. The method according to claim 1, wherein the weld tip of the stud is connected to an end face of the barrel, the end face being tapered in the form of a shallow frustum such that a central portion of the end face to which the weld tip is connected is projected with respect to a periphery of the end face to ensure contact between the weld tip and the second plate when the weld tip is melted by the electric current.

7. The method according to claim 1, wherein the stud includes a threaded extension connected to the head of the stud for attaching a structure to the stud.

8. A method of joining plates comprising the steps of:
providing first and second metal plates each having a thickness, the first plate including a plurality of holes having a diameter;
providing a plurality of rivets made from an electrically conductive material, each rivet including a head, a barrel and a weld tip, the barrel of the rivet having opposite ends respectively connected to the head and the weld tip, the barrel of the rivet having a length that is greater than the thickness of the first plate and a diameter that is less than the diameter of the holes in the first plate;
locating the plates and rivets such the first plate is located between the rivets and the second plate;

locating the rivets such that a central axis of each rivet is aligned with a central axis of one of the holes in the first plate;

moving the rivets towards the second plate such that the weld tip of the rivets contacts the second plate and air gaps are respectively provided between the head of each rivet and the first plate and between the barrel of each rivet and the associated hole in the first plate;

applying an electric current through each of the rivets using the head of the rivet and the second plate as electrodes sufficient to melt the weld tip of the rivet whereby the rivet is bonded to the second plate at an end of the rivet; and deforming the barrel of each of the rivets such that the length of the rivet is reduced thereby reducing the air gap between the head of the rivet and the first plate.

9. The method according to claim 8 wherein the step of deforming the barrel of each of the rivets results in the air gap between the head of the rivet and the first plate being substantially eliminated.

10. The method according to claim 9, wherein the step of deforming the barrel of each rivet includes the step of:

applying force to the head of each rivet such that the barrel of the rivet is compressed.

* * * * *